United States Patent [19]
Laturnau

[11] 3,851,370
[45] Dec. 3, 1974

[54] LINEAR INSERTING APPARATUS FOR MASONRY BUILDING BLOCKS

[76] Inventor: Eugene T. Laturnau, 5 Beekman Dr., Agawam, Mass. 01001

[22] Filed: Jan. 21, 1974

[21] Appl. No.: 434,795

[52] U.S. Cl. .............................. 29/211 R, 29/208 B
[51] Int. Cl. ........................ B23q 7/10, B23p 19/04
[58] Field of Search .......... 29/211 R, 211 D, 208 B, 29/208 R

[56] References Cited
UNITED STATES PATENTS
3,733,680   5/1973   Cartwright ....................... 29/208 B

*Primary Examiner*—Thomas H. Eager
*Attorney, Agent, or Firm*—Chapin, Neal and Dempsey

[57] ABSTRACT

A tripod-like portable framework having a power-screw operated reciprocable plunger mechanism at the top for mounting in elevated relation over a loading station platform surface and for press fitting plastic insulating liner insert forms into the hollow cells of standard masonry building block units at the loading station. On one of the legs of the frame a liner insert form carrier is pivoted, the carrier having vertically disposed sleeves arranged for successively indexing forms held thereby under the plungers and for aligned guiding of the forms forced by the plungers into the cells of block units positioned on the loading platform surface.

5 Claims, 5 Drawing Figures

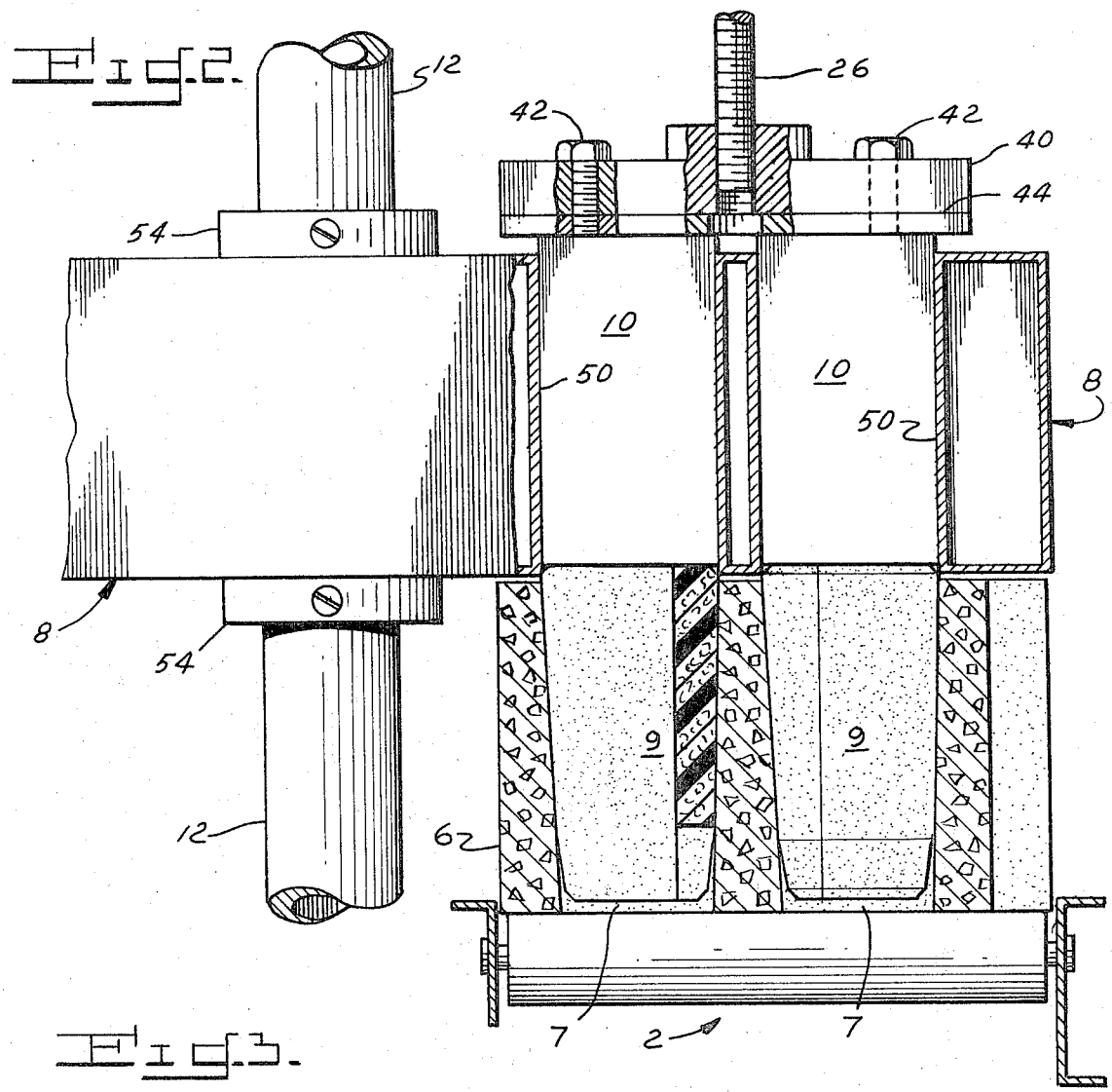
Fig. 2.
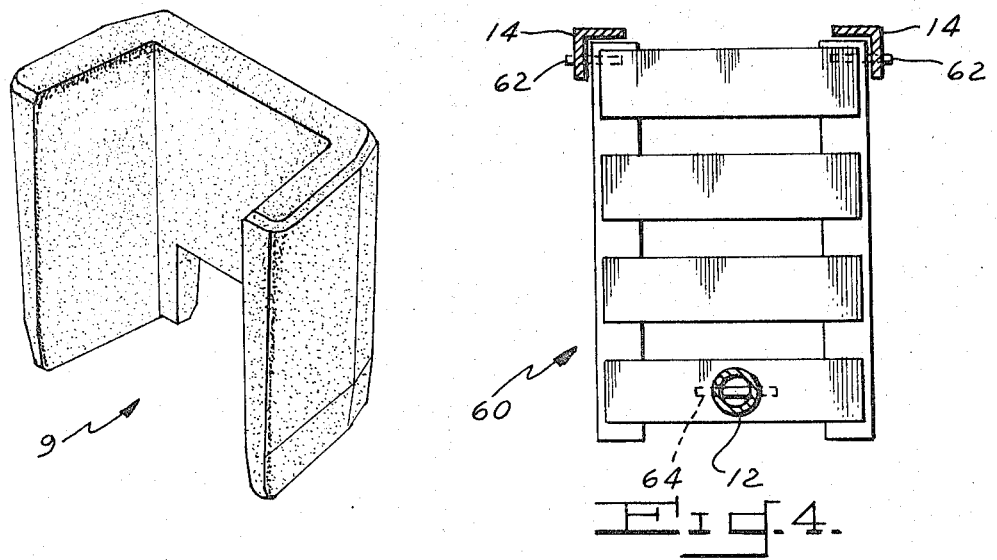
Fig. 3.
Fig. 4.

3,851,370

LINEAR INSERTING APPARATUS FOR MASONRY BUILDING BLOCKS

BACKGROUND OF THE INVENTION

This invention relates to a press apparatus for the plunger loading of plastic liner insert forms into the hollow cavities or cells of standard masonry blocks and particularly to a simple, portable device especially suited for occasional use in such block producing plants where normal and usual production orders are for the primary or basic block structure alone. The device provides an overhead reciprocable ram mechanism having plungers operable to successively press plastic insert forms out of a plurality of vertically disposed guide sleeves or holding channels of a horizontal, rotatably indexible, carrier and into fitted position in the cells of the blocks which are successively brought into registration under the plungers at the loading station.

While specialized forms of interfitting liner insulated blocks are known, it is well recognized in the building trade that insulating materials have most commonly been incorporated into standard wall structures by pouring or blowing loose insulating fill into the hollow cells of the blocks subsequent to the on-site erection of a wall. Recently, however, pre-formed foamed plastic insert liners specifically for frictional assembly within the hollow cells of standard masonry blocks have been designed as an alternative to loose fill. Because of superior insulating qualities over a longer period of time blocks fitted with such liners are increasingly being used. One form of this type of insert comprises a U-shaped member of foamed plastic composition. Heretofore, insofar as is known, such forms have been inserted into the raw block by manually hammering into place.

An object of the present invention is primarily to provide suitable mechanism for mechanically pressing the plastic forms into place rapidly and economically, and to do so with a minimum of interference or departure from customary procedures normally employed in handling the standard blocks for delivery. The device is designed to straddle any suitable platform surface as, for example, a section of a roller conveyor customarily used in a plant for individually transferring the usual basic block units to a collecting station where the blocks are then stacked for shipment. Thus the device can be set up for temporary or extended use, as required, without changing existing facilities or plant layout, or materially altering the normal and usual procedures for handling the blocks in a given plant.

SUMMARY

This invention contemplates a framework preferably of a portable nature having a top horizontal frame section with its ends supported at an elevated position by vertical leg supports and carrying a power-screw driving mechanism operable to vertically reciprocate a set of plunger rams underneath said top section. At one end of the top section a single supporting leg or post is provided on which a carrier guide member is pivoted for rotation. The carrier member has at least two angularly disposed sets of hollow vertical channels or sleeves in radially spaced relation to the post. The carrier is rotatable to alternately index each set of sleeves into alignment between the plunger rams (at their upper limit of travel) and the hollow cells of masonry blocks registered under the rams at an underlying loading station surface. The plunger mechanism drives the rams against the plastic insert forms held by the carrier sleeves and forces them into the hollow cells while the sleeves hold the inserts in an accurately aligned relation during the pressure stroke. On retraction, the plungers are drawn upwardly of the carrier, the latter being then rotated to carry another set of filled sleeves thereunder while the blocks are replaced at the loading station for a succeeding cycle. The vertical legs of the frames are preferably adjustable so as to properly align the path of the plunger through the sleeves for a straight line thrust towards the cells of blocks which may be resting on a slightly tilted loading surface. Preferably also a counterweight platform means is provided at the foot of the vertical leg supports so as to prevent the pressure forces applied from overcoming the weight of the device and displacing the vertical supports.

DRAWINGS

FIG. 2 is a sectional view illustrating the operation of the plunger loading of plastic insert liners into the cells of a building block;

FIG. 3 is a perspective view of a plastic liner insert form;

FIG. 4 is a plan view showing a platform supported between the lower portions of the legs for receiving a counterweight load; and FIG. 5 is a detail view illustrating an adjustable foot for leg support.

DESCRIPTION

Figure 1:
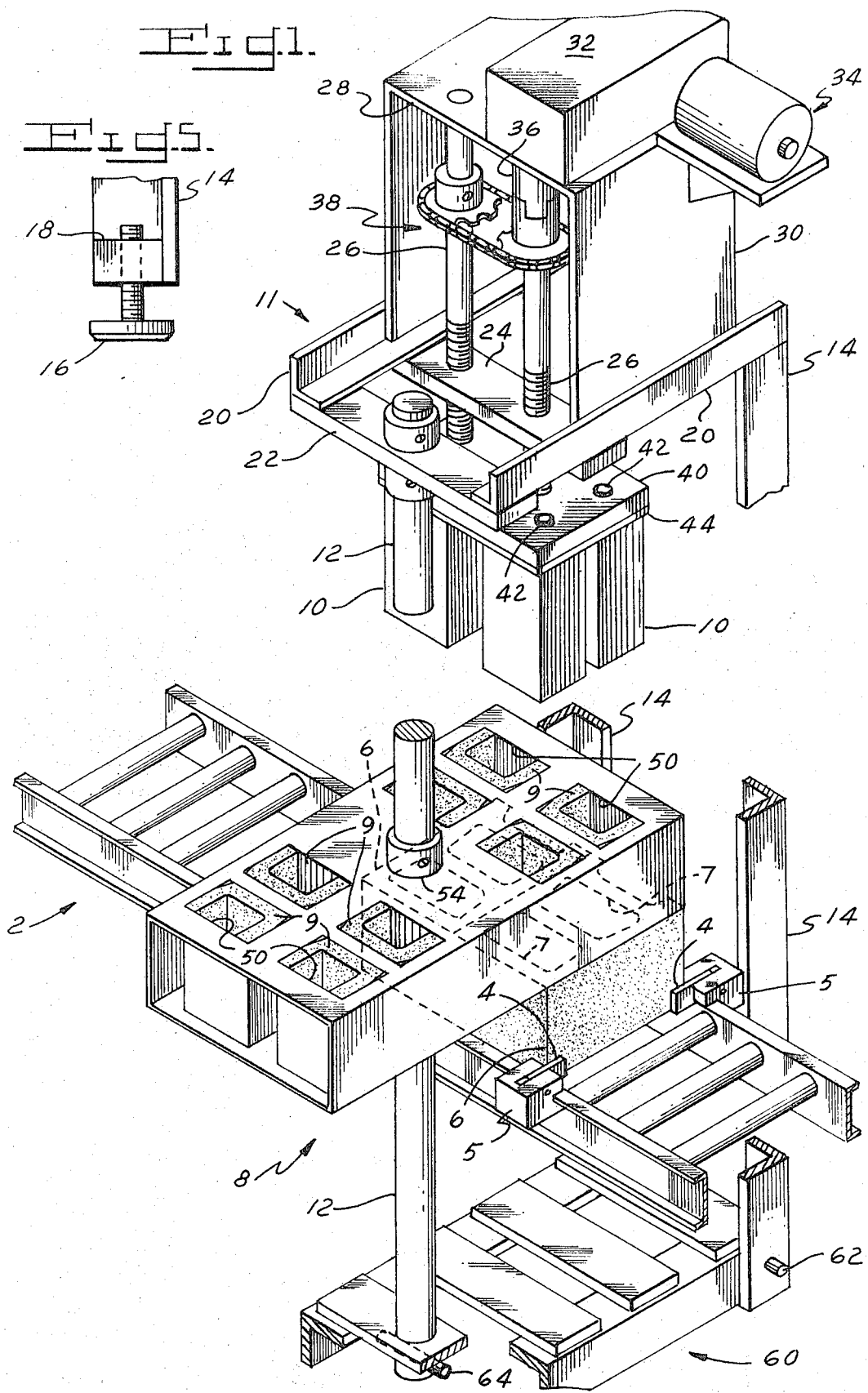
FIG. 1 is a schematic pictorial illustration of an assembly embodying the invention with parts omitted and sections of the assembly in "exploded" relationship.

Apparatus according to the present invention is schematically shown by FIG. 1 in association with a masonry block loading station provided as may be convenient along the run of a roller conveyor indicated at 2. This type of conveyor is typically used for transferring blocks as from an inventory storage area to a stacking table where they are then arranged as on pallets for shipment and delivery. It will be further appreciated that such a conveyor is commonly tilted to a slight degree to facilitate handling and it is along this path that the plastic insert liners may be most economically fitted into the basic masonry block units as required for particular orders.

In FIG. 1 the down-stream end of the conveyor path is to the right. The present apparatus may straddle a conveyor such as that indicated at any suitably convenient location and thus provide the loading station. The forward edge of such a station is here shown as being defined by opposed stops 4 extending inwardly from the side rails of conveyor 2. Stops 4 are pivoted on mounts 5, slidably clipped to the rails, and may be swung in and out of the position shown. The travel of a pair of masonry blocks as 6 on the rollers may thus be temporarily interrupted so as to position the same for correct registration with respect to the present apparatus and insertion of plastic liners in the cells. It will be apparent that other specific types of stop or indexing means may be equally effective for the purpose. A rotatable guide carrier of the device, generally indicated by numeral 8, is pivotable to align a set of liner inserts over the empty cells of blocks 6 and plungers 10 of a pressure ram mechanism then push them out of the guide carrier to fill the cells. On the full upward retraction of the plungers the lined blocks 6 are released to be succeeded at the station by another pair of blocks and a loading cycle repeated.

In the drawings the hollow cells at 7 of typical blocks 6 are shown as slightly trapezoidal in nature, the longer parallel side walls lying along the outer end walls. The U-shaped inserts 9 of FIG. 3 are designed to conform generally to such shape. In addition, as may be noted in FIG. 2 the walls of cells 7 are slightly inwardly tapered from top to bottom and the outer walls of insert 9 are likewise tapered. Such dimensional specifications relating to the block structure as will be realized are in accordance with specific building industry codes and regulations for a particular area and may vary for other areas. The particular configuration shown is accordingly representative as to such details. In general the outer walls of the liner 9 are in any event designed to require a forced insertion into the cell cavity 7 for the frictionally secure seating therein and permitting no slippage during subsequent handling.

In FIG. 1 the guide 8 and the plunger mechanism with associated parts is shown in "exploded" relation. The portable framework supporting the same is of a skeletal nature. It includes an elevated horizontal top central frame section 11 on which a reciprocable power screw mechanism for actuating the plungers is mounted. The frame section is supported at one end by a pivot post 12 on which guide 8 is mounted, and at the other end by a pair of vertical angle iron support legs 14.

The pivot post and leg members are preferably provided with any suitable means for the relative vertical adjustment thereof in order to enable the tilting of the top center frame section. Thus the plunger path may be adjusted for a more or less directly perpendicular relation to blocks 6 resting as on an inclined roller plane and thus a straight-line thrust of the plastic inserts into the cells. Illustrated in FIG. 5 is a representative foot structure for such adjustment. The foot 16 is shown with a stem threaded into a block 18 fixed as by welding at the lower end of angle iron leg 14. Similar adjustable feet may be provided at the base of the other leg 14 and the post 12. The adjustable feet also compensate for an uneven floor surface and when once so adjusted the apparatus may be removed and erected as needed at a particular loading station position without requiring further excessive manipulation.

The top frame section 11 as here shown includes a pair of opposed side members as the angle irons 20 joined by end frame members as the plate at 22. An intermediate brace or bar at 24 is also fixed between the angle irons 20. A pair of power screws at 26 are rotatably held in position by the bar 24, the upper ends thereof being suitably suspended and journaled in an overhead top wall 28 of a canopy 30 mounted on the angle irons 20 and on which a gear reduction box at 32 with reversible electric motor drive at 34 is mounted.

The output end as at 36 of the gear reduction drive has an aligned clutch connection with the upper end of the driven power screw 26, the other screw being driven simultaneously therewith as by a sprocket and chain driven indicated by arrow 38. The screws extend through frame support bar 24 and are provided with a conventional power screw thread connection with a ram or presser plate 40 below bar 24 for reciprocably driving plunger members 10. Removably attached to plate 40, as by screw bolts at 42, is a plunger head plate 44 on which the box-like plungers 10 are carried to hang therefrom in spaced relationship corresponding to the spacing of a pair of standard size masonry block cells.

The head plate 44 is here shown with two sets of plungers 10 for suitably loading a pair of masonry blocks with plastic inserts and may be removed from the pressure plate 40 so that a similar plate with plungers of other standard dimensions can be utilized by the apparatus for loading blocks of other standard sizes. Conventionally, masonry building blocks for the most part are produced in two or three standard sizes only, as may be stipulated by applicable construction code regulations.

The guide carrier 8 designed to receive plungers 10 for slidably guiding liner inserts into the cells of blocks 6 during a loading cycle is here shown in the form of a rectangular box-like turntable member having at each end two pairs of through passages, as the sleeve-like channels indicated at 50, lying in opposed 180° relationship with respect to pivot post 12. The channels extending outwardly of the post may thus be manually filled with liner inserts 9 while the inserts carried in the channels at the other end are being pressed at the loading station into a pair of blocks 6 during a plunger loading cycle. After a pair of blocks are lined with the inserts, the plungers will be retracted and another pair of blocks brought to the loading station while guide 8 is rotated 180° to index the channels for another loading cycle. The guide can be rotated in the same direction or swung back and forth to the loading station.

As will be seen in FIG. 2 plungers 10 will press the inserts from channels 50 into the hollow cells of the blocks, the channels holding the inserts aligned for a guided and substantially straight-line thrust. Channels 50 are preferably dimensioned to receive the inserts 9 with sufficient friction to keep them in the channels until ram pressure is exerted. In FIG. 2 the plungers are shown near the end of a stroke the completion of which will deposit the liners fully within cells 7.

So that the carrier and guide 8 may be adjusted in accordance with the level of the masonry blocks at a given loading station provision is also made for adjusting the elevation of the guide 8 on pivot post 12. As illustrated in the drawings a pair of collars 54 are provided with set screws to hold the guide at the height desired. The collars thus permit elevational adjustment in the initial erection of the apparatus at a particular loading station. They also permit appropriate adjustment to accommodate a carrier guide of different dimensions when the apparatus is set up for other standard sizes of masonry blocks. In the latter instance the plunger head plate 24 is replaced as well to provide a suitably dimensioned arrangement of plungers 10. Carrier 8 is replaced by sliding the lower collar and carrier off the base of the post 12 and fitting the appropriate carrier thereon for operation with the plungers as described.

The device as above mentioned is designed primarily for temporary operation and use and in order to provide a portable apparatus for economically handling an occasional demand for liner insulated standard building blocks. The framework and operational mechanism mounted thereon as schematically disclosed herein is of a fairly light weight character as will be appreciated, so that it may be readily removed to a storage area when not in use. Accordingly, in order to prevent the pressure on the power stroke of the plungers from overcoming the weight of the device a counterweight support may be provided between the vertical leg supports adjacent their lower ends. A platform connecting frame 60 is shown by FIG. 5, being releasably fixed at one end to the leg supports 14 as by the removable pin connections at 62 and to the lower end of post 12 as by the opening of the end cross member received by the post and supported thereon by a cross pin at 64. The platform is thus arranged to receive any suitable heavy objects to counter balance the pressure forces of the plunger mechanism such as bags of sand or cement which are readily available in a building block plant.

What is claimed is:

1. Apparatus for press-fitting plastic insulating liner insert forms into the hollow cells of masonry building blocks and the like comprising, a framework having a top central section with vertical support means at each end thereof for mounting said top section in vertically elevated section over a block loading station platform surface above which said top section may be positioned, the support at one end thereof including a vertical pivot post, said pivot post and vertical support at the opposite end having adjustable means for limited tilting and elevational variation in the positioning of said top frame section, a motor operated power screw mechanism mounted on said horizontal top frame section having a pressure head below said section provided with a set of plunger members depending therefrom and vertically reciprocable below said frame section, and a liner insert form carrier rotatably mounted on the pivot post and having, radially of said post in angularly spaced relation on the carrier, at least two sets of vertically disposed through passages to receive liner insert forms, said sets of passages being sequentially indexible into underlying vertical alignment with said plunger members above the cells of masonry blocks at a loading station, said through passages holding the insert forms aligned for guided movement during downward travel of the plunger members for the seating of said forms in the cells.

2. The structure of claim 1, in which said set of plungers are removably mounted on said presser head of the power screw mechanism and said rotatable carrier is removably mounted on said pivot post.

3. The structure of claim 2, in which said pivot post and support at the other end of the top frame section form a three-legged mounting therefor with each leg having a vertically adjustable foot member for the limited elevational and tilted positioning of said top frame section over a loading platform station.

4. The structure of claim 3, in which said apparatus is portable and a detachable platform frame removably connects said three leg supports at the lower end portions thereof for placing thereon a counterweight to overcome pressures exerted by the plungers in pushing said liner forms into said blocks.

5. The structure of claim 4, in which said pivoted carrier is rectangular in outline and said sets of through passages are at the ends thereof in diametrically opposed 180° relation with respect to the post, said through passages being formed to frictionally hold liner inserts therein until said plunger members engage the same.

* * * * *